United States Patent [19]
Locher et al.

[11] Patent Number: 5,245,501
[45] Date of Patent: Sep. 14, 1993

[54] PROCESS AND APPARATUS FOR CONTROLLING AND MEASURING THE MOVEMENT OF AN ARMATURE OF AN ELECTROMAGNETIC SWITCHING MEMBER

[75] Inventors: Johannes Locher, Stuttgart; Hans-Joachim Siebert, Schwieberdingen; Herbert Graf, Ditzingen; Nestor Rodriguez-Amaya, Stuttgart; Anton Karle, VS-Villingen; Alfred Schmitt, Ditzingen; Joachim Tauscher, Stuttgart; Werner Zimmermann, Gerlingen, all of Fed. Rep. of Germany; Dominique Buisson, Venissieux, France; Lucien Hehn, Le Colibri, France; Pierre Lauvin, Francheville, France; Henri Paganon, Venissieux, France

[73] Assignee: Robert Bosch GmbH, Stuttgart, Fed. Rep. of Germany

[21] Appl. No.: 689,769
[22] PCT Filed: Dec. 7, 1989
[86] PCT No.: PCT/DE89/00758
  § 371 Date: Jun. 26, 1991
  § 102(e) Date: Jun. 26, 1991
[87] PCT Pub. No.: WO88/02544
  PCT Pub. Date: Apr. 7, 1988

[30] Foreign Application Priority Data
Dec. 22, 1988 [DE] Fed. Rep. of Germany ....... 3843138

[51] Int. Cl.⁵ .......................................... H01H 47/00
[52] U.S. Cl. .................................. 361/154; 361/152; 361/194; 361/195; 324/381
[58] Field of Search ............... 361/139, 152, 153, 154, 361/194, 195; 324/378, 380, 391

[56] References Cited

U.S. PATENT DOCUMENTS

| | | | |
|---|---|---|---|
| 4,680,667 | 7/1987 | Petric | 361/154 |
| 4,729,056 | 3/1988 | Edwards et al. | 361/153 |
| 4,856,482 | 8/1989 | Linder et al. | 123/506 |

Primary Examiner—Jeffrey A. Gaffin
Attorney, Agent, or Firm—Kenyon & Kenyon

[57] ABSTRACT

A process for controlling and measuring the movement of an armature of an electromagnetic switching member with an excitation coil is proposed, which has the following steps: a current (i) or a voltage (u1) is applied to the excitation winding (3) in order to move the armature into a first actuatable position; before the start of the movement of the armature, the current or the voltage is raised above a value at which the armature remains in the actuated position, and before termination of the movement of the armature the current or the voltage is reduced to a defined value, which suffices to hold the armature in the actuated position; finally, the temporal variations in the current or the voltage are measured after setting of the defined value, for the purpose of recognizing the termination of the armature movement. With the aid of this process, it is possible for the movement of the armature, for example of a solenoid valve for a fuel injection device of an internal combustion engine, to be very precisely monitored, so that the injection instant and injection period can be optimally set.

18 Claims, 5 Drawing Sheets

PROCESS AND APPARATUS FOR CONTROLLING AND MEASURING THE MOVEMENT OF AN ARMATURE OF AN ELECTROMAGNETIC SWITCHING MEMBER

BACKGROUND INFORMATION

The invention proceeds from a process for measuring the movement of an armature of an electromagnetic switching member.

Such a process is known from German Patent 2,251,472. According to said patent, the mechanical movement of a solenoid valve armature is controlled by the measurement of the current flowing through the magnet winding, in particular by measuring the temporal variations in the current rise.

This process has the disadvantage that disturbances in the voltage supply, which lead to temporal variations in the current flowing through the magnet winding or excitation winding, are misinterpreted as an indication of the movement of the magnet armature. Thus, a reliable monitoring of the movement of a solenoid valve armature is ruled out in this way.

The invention also relates to a device in particular for carrying out a process of the type mentioned above.

In the case of a device of this type known from German Patent 2,251,472, measurement of the temporal variations in the current applied to the excitation winding is carried out during a period that stretches from the start of the driving of the armature to beyond the termination of the movement thereof. Consequently, it must be ensured that during this monitoring phase no temporal variations take place in the current characteristic that are caused by external influences and from which conclusions could be drawn concerning a movement of the armature. The possibilities of driving the associated solenoid valve are thereby restricted.

ADVANTAGES OF THE INVENTION

By contrast, the process according to the invention has the advantage that the movement of the armature of an electromagnetic switching member can be reliably recognized independently of fluctuations in the energy supply. It is particularly advantageous that the energy required to produce the movement of the armature can be very high for a short time at the start of a switching operation, in order to accelerate the movement of the armature. As soon as the armature moves, the energy is reduced to the extent that the armature remains in its actuated position, in the closed position.

Correspondingly, in the case of the opening of the electromagnetic switching member, the energy which holds the armature in its actuated position, the closed position, is reduced very rapidly to zero, or even to a negative value. As a result, strong accelerative forces act on the armature. As soon as the latter moves, the energy is once again raised to a value which is below the holding energy that is required in order to hold the armature in its actuated position. As a result, the armature moves very rapidly into the open position. The raising of the energy to a defined value below the holding energy induces a magnetic field whose variation, which is based upon the movement of the armature or upon the termination of the movement of the armature, can be measured.

There is particular preference for a process in which the rapid raising of the energy to a high level during the closing operation, or the rapid reduction of the energy to a low level during the opening operation is maintained only for so long as a movement of the armature takes place. Since the direct measurement of the armature movement is very complicated, the defined value of the energy is set after a time $T_0$ after which a movement of the armature certainly takes place. However, the time is chosen to be shorter than the time that elapses up to the point when the closed-circuit condition or the open-circuit condition is reached. A strong acceleration of the armature is achieved in this way.

In a preferred process, the defined value of the energy is held approximately constant at least up to the termination of the armature movement. The movement of the armature can thereby be monitored particularly simply.

Finally, in a particularly preferred process the variation in the current or in the voltage at the excitation winding is measured in a time interval that starts before the termination of the movement and ends after the termination of the movement. In this way, a filter function is achieved which ensures that current or voltage variations caused by external influences are not misinterpreted.

By contrast with known devices, the device according to the invention, in particular for carrying out a process of the type mentioned above, has the advantages that temporal variations in the current or voltage characteristic immediately after the closing or opening operation are not measured. Consequently, it is possible during the closing of the electromagnetic switching member to set the energy required for movement of the armature very high for a short time, and to reduce it after the start of the movement of the armature. Correspondingly, it is possible after the opening of the electromagnetic switching member to reduce very rapidly the energy applied at the excitation winding. With this device, the temporal variations occurring during closing and opening are not misinterpreted as movements of the armature.

Advantageous further developments and improvements of the process and of the device of the present invention are possible by means of the measures set forth in the subclaims.

BRIEF DESCRIPTION OF THE DRAWINGS

The invention is explained in more detail below with reference to the drawings, wherein.

DETAILED DESCRIPTION

The process and device in accordance with the invention are suitable for controlling and measuring the movement of an armature of an arbitrary electromagnetic switching member. Preferably, the process and device of the type described below can be used in the control and measurement of the movement of a magnet armature of a solenoid valve that is employed to control an injection pump of a diesel engine. However, it is also possible to monitor the movement of an armature of a solenoid valve that is employed, for example, for an anti-locking device of a braking system.

Figure 1:
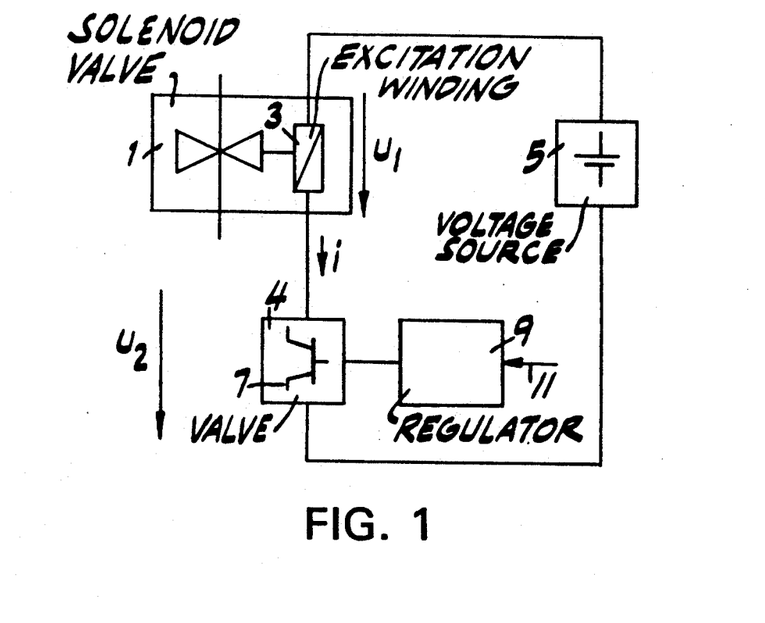
FIG. 1 shows a block diagram of a control of an electromagnetic switching member.

Represented as an example in FIG. 1 is a solenoid valve 1 that is employed to control an injection pump (not represented in the figure) of a diesel engine. The excitation winding 3 of the solenoid valve is connected in series to a voltage source 5 and to at least one controllable switch or one electrically or electronically controllable valve 7, for example a transistor, which is triggered by a control and regulation unit 9 in conformity with a control signal 11. The voltage dropping at the excitation winding 3 is designated by u1, and the voltage at the valve 7 by u2.

Figure 2:
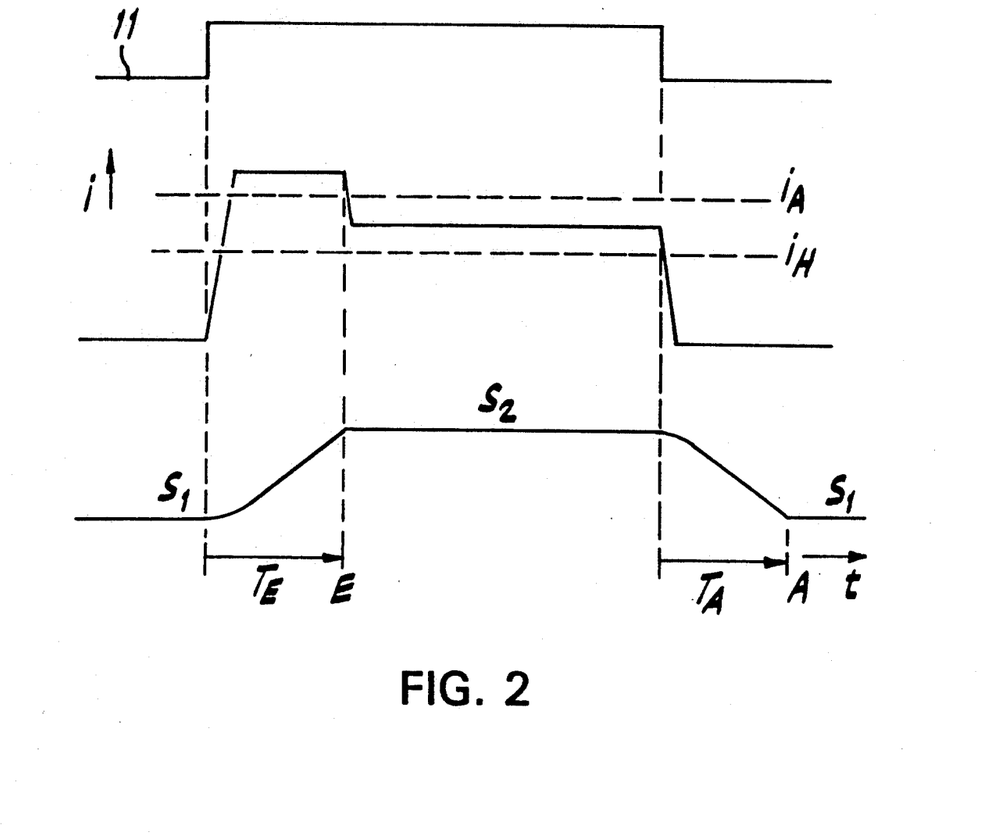
FIG. 2 shows a circuit diagram associated with the diagram in accordance with FIG. 1.

FIG. 2 shows a possible temporal variation in the control signal 11 of the current i flowing through the excitation winding 3, and the temporal variation in the movement of the armature of the solenoid valve 1. The latter can be brought from a non-actuated position S1 into an actuated position S2.

The movement of the magnet armature from the position S1 into the position S2 is designated as the closing operation. The time elapsing up to the point that the closed position S2 is reached is designated by $T_E$, the closing instant by E. Correspondingly, the movement of the magnet armature from the position S2 into the position S1 is designated as the opening operation. The opening time is designated by $T_A$, the opening instant by A.

Here, the solenoid valve is triggered by a rectangular control signal. When the control signal 11 is applied, the current i increases beyond a first value designated as inrush current $i_A$. The inrush current is necessary in order to bring the solenoid valve from its open position S1 into the actuated position S2.

Upon expiry of the closing time $T_E$, the current i flowing through the excitation winding 3 is reduced to a value below the inrush current. Here, it is higher than the holding current $i_H$, which is at least necessary to hold the magnet armature of the solenoid valve in its actuated position S2.

If the solenoid valve 1 is to be opened, the control signal 11 is reduced to its initial value. At the same time, the current i flowing through the excitation winding 3 is likewise reduced to the initial value, for example to zero. As a result, the armature of the solenoid valve moves from the actuated position S2 into the non-actuated position S1. Upon expiry of the opening time $T_A$, the armature has reached the open position S1.

The closing and opening times $T_A$ and $T_E$, and thus the closing instant E and the opening instant A are dependent upon a range of parameters, for example upon manufacturing tolerances, the condition of the voltage source or the level and rate of variation of the current i, and are therefore subject to substantial dispersions. As a result, when fuel is injected undesired deviations arise in the injection time and in the amount injected.

Figure 3:
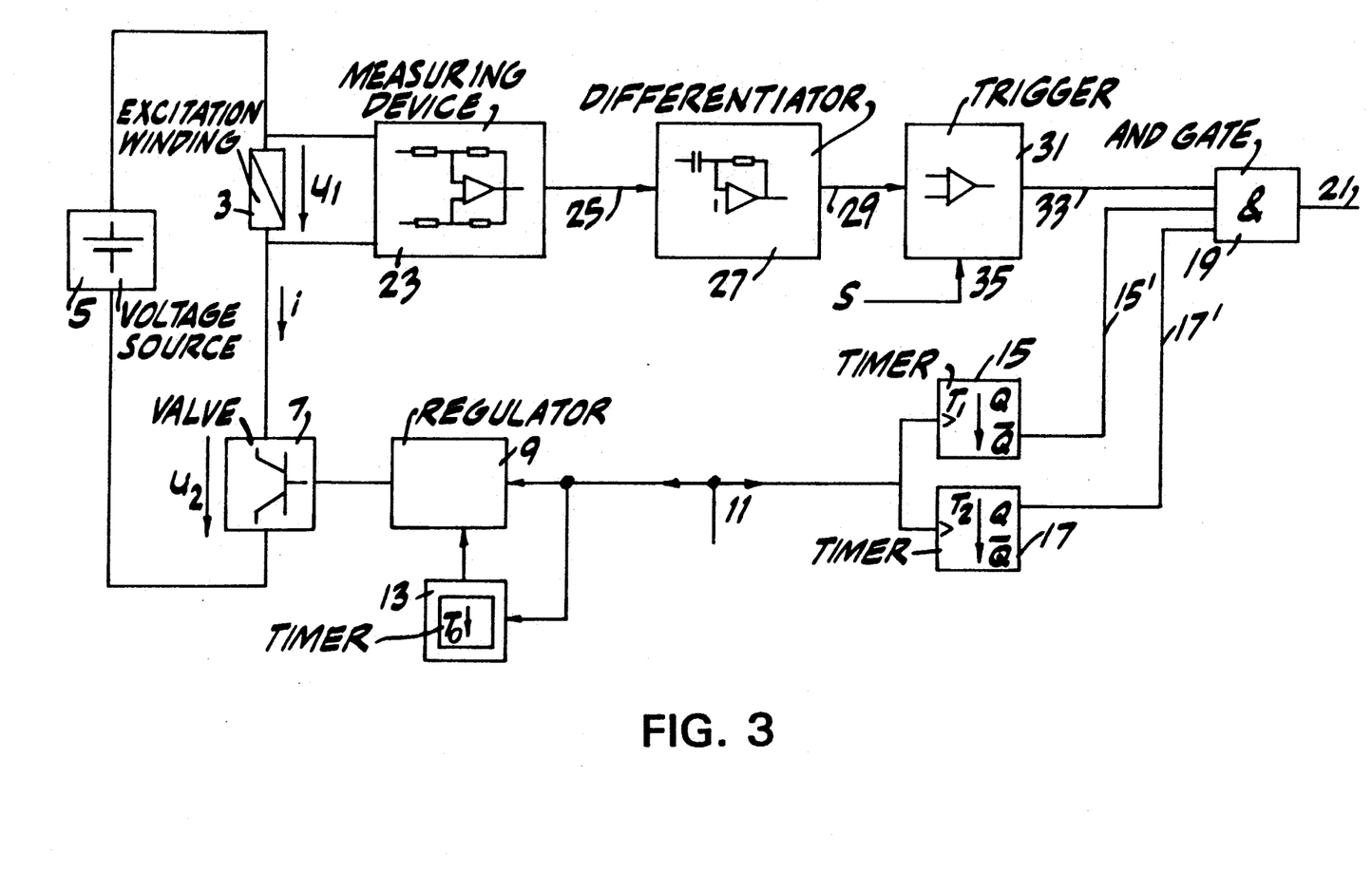
FIG. 3 shows a block diagram of a device according to the invention.

FIG. 3 shows a circuit arrangement by means of which the movement of the armature of an electromagnetic switching member can be controlled and measured. By way of example once again, a solenoid valve, of which here only the excitation winding 3 is represented, is chosen here as the switching member. Said winding is connected in series to a voltage source 5, for example a battery, and to a controllable switch or electronically controllable valve 7, for example a transistor. The voltage dropping at the excitation winding 3 is designated by u1, the voltage at the valve 7 by u2, and the current flowing in the series circuit by i. The controllable valve is triggered by a control and regulation unit 9, to which a control signal 11 is fed. A time generator or a timing element 13, which is designed, for example, as a monoflop, is associated with the control and regulation unit 9. In addition, measuring signals (not represented in FIG. 3) for the current i or the voltages U1 and U2, respectively, can be fed to the control and regulation unit 9.

The control signal 11 is also supplied to a first time generator 15 and to a second time generator 17 of a gate circuit. Flipflops, for example, are employed here as time generators, the inverting output of the first time generator 15, and the non-inverting output of the second time generator 17 being connected here to an AND gate 19. The output signal of the AND gate is designated here by 21.

A measuring device 23, for example a difference amplifier, is connected in parallel to the excitation winding 3. The output signal of the measuring device 23 is supplied via a line 25 to a differentiating circuit 27, which contains, for example, an operational amplifier wired in the usual way. The differentiating circuit 27 is connected via a line 29 to a trigger 31, which serves as a comparator circuit and whose output signal is fed via a line 33 to the AND gate 19. A threshold value S is fed to the trigger 31 via a line 35.

The circuit according to FIG. 3 can be modified by replacing the measuring device 23, connected in parallel to the excitation winding 3, for the voltage $U_1$, by a measuring device for the current i, which is, for example, a shunt in series with the excitation winding 3 and whose output signal is likewise supplied to the differentiating circuit 27.

The function of the circuit represented in FIG. 3 is now to be explained, along with the temporal variations of the potentials in different lines of the arrangement, with reference to a closing operation. The temporal variation of the potentials is represented for this purpose in FIG. 4.

The temporal variation of the control signal 11 is represented at the very top in the diagram. By virtue of this signal, the controllable switch 7 of the control and regulation unit 9 is triggered, resulting in the variation of the current i represented in FIG. 4. The current through the excitation coil at first rises very rapidly to a value which is given by the voltage of the voltage supply 5 and by the internal resistance of the excitation winding 3, as well as by the internal resistance of the controllable switch 7. After a time $T_0$, the controllable switch or the valve 7 is triggered by the control and regulation unit 9, resulting in a defined value, the constant inrush current $i_E$. The time $T_0$ is predetermined by the time generator 13. The control signal 11 is applied to the time generator, which influences the control and regulation unit 9 so that the current i through the excitation winding 3 is at first not influenced and rises to a maximum value. The control and regulation unit 9 is activated after the dead time $T_0$.

The time generator 13 is dimensioned such that the predetermined dead time $T_0$ is shorter than the closing time $T_E$ of the electromagnetic switching member or of the solenoid valve.

The dead time $T_0$ is chosen such that the current i flowing through the excitation coil 3 is not reduced until the armature of the excitation winding has started to move. This may likewise be seen from FIG. 4. After the time $T_0$, the armature has moved out of a basic position S1 in the direction towards an actuated position S2. The movement of the armature is concluded at the closing instant E, that is to say after expiry of the closing time $T_E$. At this instant, the magnet armature has reached the actuated position S2.

Figure 4:
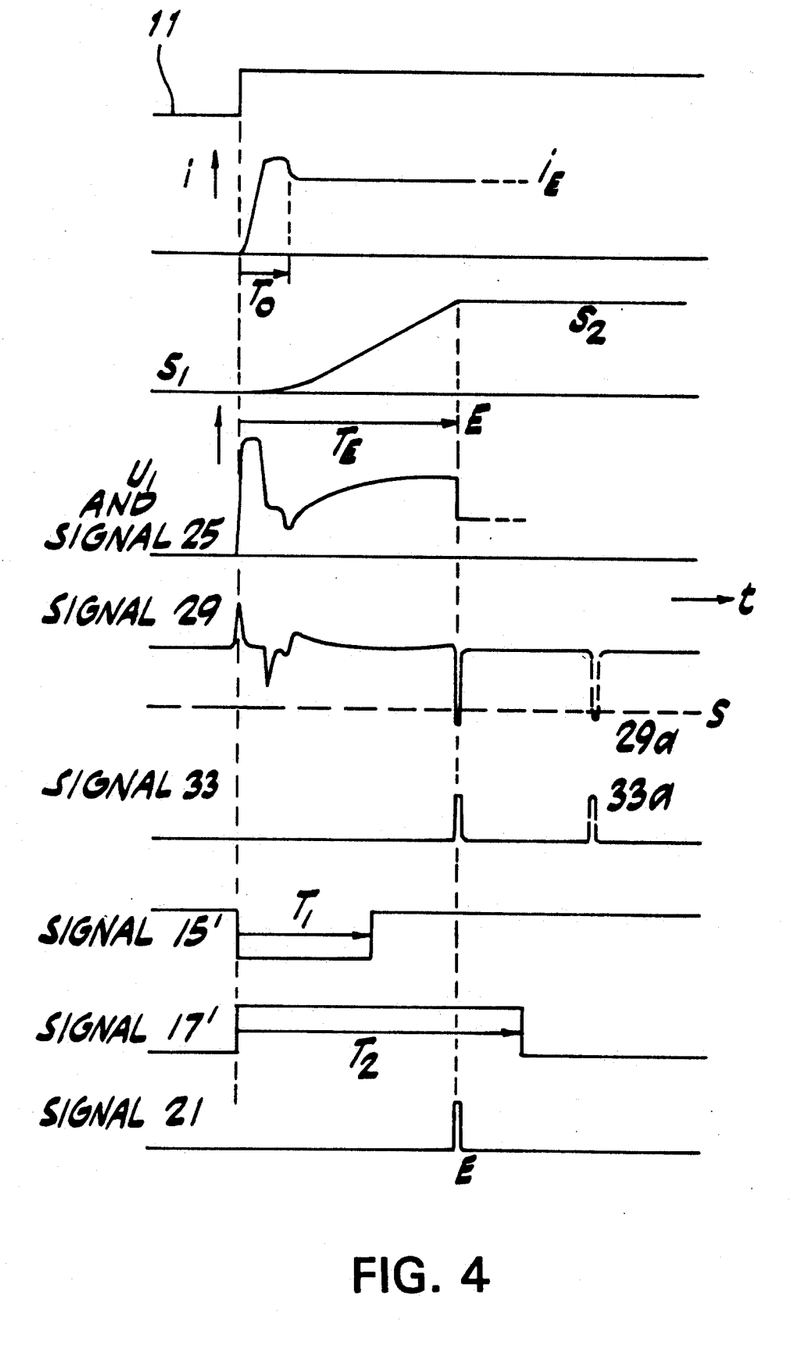
FIG. 4 shows a diagram of the temporal variation in different signals in the device in accordance with FIG. 3 during a closing operation.

Represented in the fourth diagram from the top in FIG. 4 are the temporal variation of the voltage u1 dropping at the excitation winding 3, and the potential of the line 25, that is to say the output signal of the measuring device 23.

Just like the output signal of the measuring device 23, the voltage u1 at the excitation winding 3 rises very rapidly. It may be seen from the diagram that because of the movement of the armature, but also owing to the reduction in the current i, the voltage u1 at first falls and then once again slowly rises. As soon as the armature has reached the actuated position S2, that is to say as the movement of the armature is terminated, the voltage u1 at the excitation winding 3, and thus at the output of the measuring device 23 drops suddenly.

Represented in the fifth diagram from the top in FIG. 4 is the potential variation at the output of the differentiating circuit 27, that is to say the signal on the line 29. It is a matter here of the temporal derivative of the signal on the line 25. The voltage peak occurring at the output of the differentiating circuit 27, which occurs upon termination of the armature movement at the closing instant E, is particularly clear.

The termination of the movement of the armature can be determined on the basis of this voltage peak. For this purpose, the signal on the line 29, the output signal of the differentiating circuit 27, is fed to the trigger 31. The latter compares the output signal of the differentiating circuit to the input threshold value S. As soon as the signal on the line 29 undershoots the threshold value S, a signal appears at the output 33 of the trigger 31, as is represented in FIG. 4. The threshold value S is chosen such that the trigger 31 does not react to relatively small spurious signals. Consequently, at the closing instant E a pulse occurs in the output signal 33 of the trigger.

On the basis of a spurious signal, e.g. in the energy supply, it is also possible for the output signal 29 of the differentiating circuit 27 to have undesired voltage peaks 29a, which undershoot the threshold value S. In such a case, an output signal 33a, which would be interpreted as termination of the movement of the armature, would occur along the output line 33 of the trigger 31.

In order to avoid misinterpretations of this type, a gate circuit is provided with the aid of which an evaluation of the output signals 33 is enabled only within specific periods. Provided for this purpose are a first time generator 15 and a second time generator 17, whose output signals 15' and 17' are supplied to an evaluation circuit, which is designed here as an AND gate 19. The latter is also connected to the output 33 of the trigger 31.

The first time generator is designed such that during a time $T_1$ a signal is applied to its inverting output. Thus, during the time $T_1$ a negative pulse transmitted by the first time generator 15 is applied to the evaluation circuit or to the AND gate 19.

The second time generator is designed such that a positive pulse is applied during a time $T_2$ to its non-inverting output 17'.

It is ensured by means of the gate circuit and the evaluation circuit that the output signal 33 of the trigger 31 is routed onward, i.e. appears at the output 21 of the AND gate 19, only if, firstly, the negative signal of the first time generator 15 is no longer present, and if the positive signal of the second time generator 17 is applied to the evaluation circuit. The output signal of the trigger can thus be routed onward only upon expiry of the time $T_1$ and before expiry of the time $T_2$.

The times $T_1$ and $T_2$ are chosen such that the output signal of the trigger is routed onward, and thus evaluated, only in a period that starts before the closing instant E and ends after said instant.

The variation in the signals at the outputs of the time generators 15 and 17 is represented in FIG. 4. Likewise, the output signal 21 of the evaluation circuit is reproduced there. It is clear that only at the termination of the movement of the armature does a signal appear on the line 21. Outside the time frame predetermined by the dead-time circuit, error signals occurring due to voltage fluctuations cannot pass the evaluation circuit. Error signals are thus filtered out. It is possible in this way to determine the termination of the movement of the armature with a very high reliability.

If the armature reaction is so weak that the signal peak occurring on termination of the movement cannot be reliably recognized, it is advantageous to provide further differentiating circuits connected in series between the differentiating circuit 27 and the trigger 31.

Figure 5:
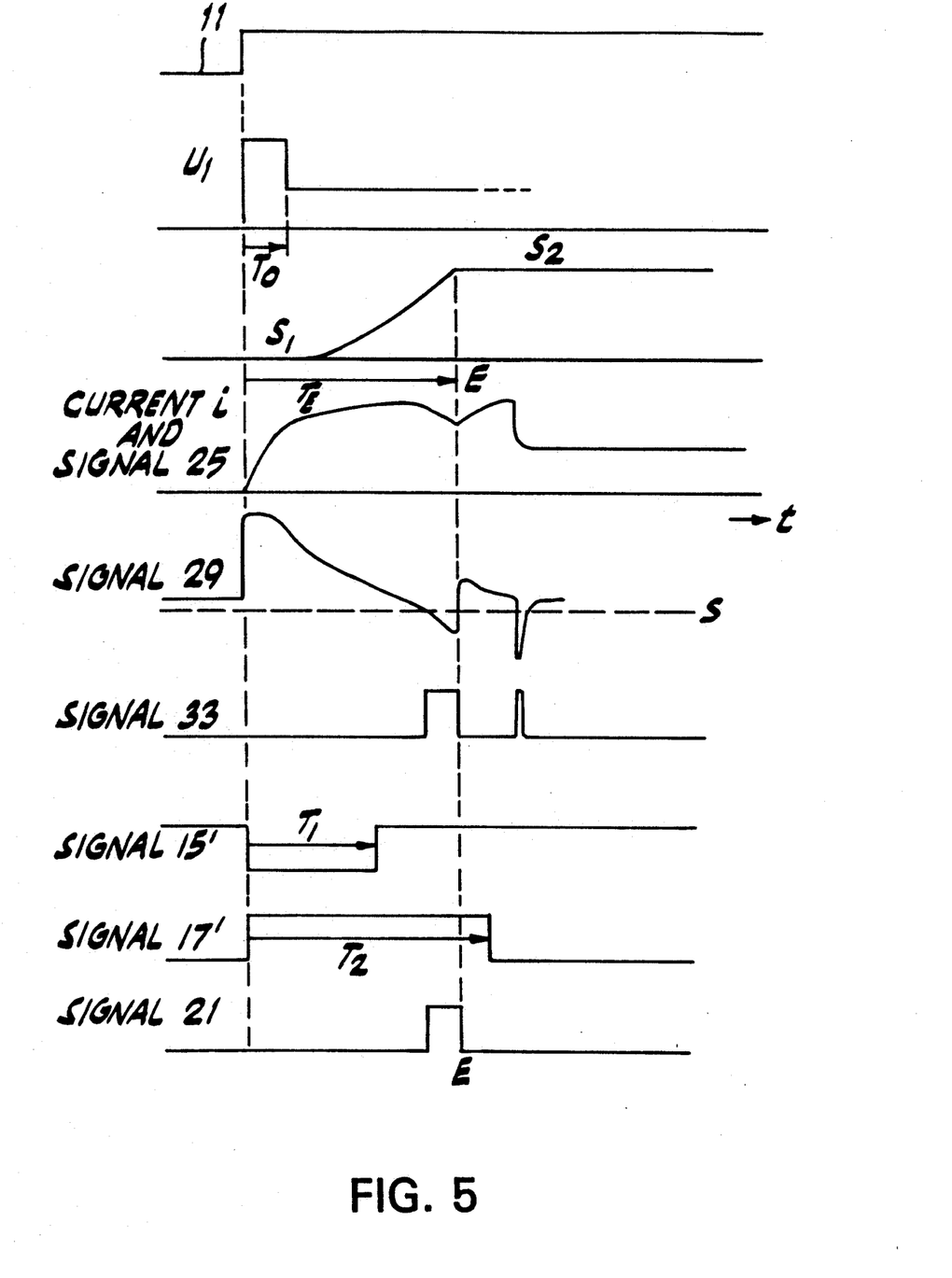
FIG. 5 shows a further diagram of the temporal variation in different signals of the circuit in accordance with FIG. 3 during the closing operation.

Whereas with reference to FIG. 4 there was a description of the current triggering of an electromagnetic controlling member, with reference to FIG. 5 there is an explanation of the voltage triggering of such a switching member during the closing operation. As already described above, for this purpose the measuring device 23 for the voltage $U_1$ is replaced by a measuring device for the current i, the output signal of which is likewise fed to the differentiating circuit 27.

The temporal variation in the control signal 11 is represented in the first diagram. The second diagram according to FIG. 5 shows the temporal variation of the voltage u1 applied to the excitation winding 3. Here, too, after a time $T_0$ predetermined by the time generator 13 a reduction is undertaken in the supply energy, i.e. the voltage is reduced to the constant inrush voltage. This energy suffices to hold the armature of the switching member in the actuated position. At first, as with the current triggering, the voltage is raised to a maximum value, which is determined by the voltage supply and the loads to which the voltage source is connected. As soon as the magnet armature has started to move and left the non-actuated position S1, the voltage is reduced. Since a direct measurement of the start of the armature movement is a difficult possibility, the voltage u1 is reduced after a time $T_0$ after which a movement of the armature certainly takes place. However, this time is chosen such that it is shorter than the closing time $T_E$.

The variation in the movement of the armature is represented in the third diagram according to FIG. 5. It is clear that the armature has reached the actuated position S2 after expiry of the closing time $T_E$ or at the closing instant E.

The fourth diagram in FIG. 5 shows the temporal variation in the current i flowing through the excitation winding 3, and the variation in the signal at the output 25 of the measuring device 23. It may be seen from the temporal variation of the current i flowing through the excitation winding, and of the signal on the line 25, that there is at first a steep rise in the current. As soon as the armature starts to move, the rise is substantially smaller because of the reaction based on the magnetic field. When the armature comes to rest after expiry of the closing time $T_E$, i.e. after the closing instant E, the current rises once again.

After the armature has reached the actuated position S2, the current i through the excitation winding 3 can be reduced to a value which suffices to hold the armature in the actuated position S2. This current value is preferably only slightly larger than the holding current.

The next diagram in FIG. 5 shows the temporal derivative of the output signal 25 of the measuring device 23. This derivation is carried out with the aid of the differentiating circuit 27. It is clear from the shape of the curve that when the closed-circuit condition S2 is reached at the instant E there is a sudden change in the temporal derivative of its magnitude. Shortly before this instant, the temporal derivative undershoots a threshold value S, so that a signal appears at the output 33 of the trigger 31.

The threshold value S of the trigger 31 is chosen such that the threshold value is undershot during the movement of the armature, and once again overshot after the abrupt termination of the armature movement at the closing instant E. Thus, at the instant E an edge change occurs in the output signal of the trigger 31.

The termination of the armature movement can, then, be recognized particularly reliably if the constant inrush voltage is chosen such that the current i decreases during the armature movement, and increases once again after termination thereof. In this case, the temporal derivative of the current i, and thus the signal at the instant E fed to the trigger 31 changes sign.

If the current i flowing through the excitation winding 3 is reduced to a value that is only slightly larger than the holding current, the signal 29 at the output of the differentiating circuit 27 once again overshoots the threshold value S. In the evaluation of the signal this leads to the presence of a plurality of edge changes, which can be interpreted as termination of the armature movement. The gate circuit described above, which limits the evaluation of the output signal of the trigger 31 to a period that starts shortly before the closing instant E is reached, and ends shortly thereafter, is provided in order to avoid misinterpretations. This is achieved by virtue of the fact that the time constant $T_1$ of the first time generator 15 of the gate circuit is smaller than the closing time $T_E$, and that the time constant $T_2$ of the second time generator 17 is larger than the closing time $T_E$.

The variation in the signals of the time generators 17 and 15 is likewise represented in FIG. 5. However, reference is made in this regard to the description concerning FIG. 4.

The output signal 21 of the signal evaluation circuit 19, which is designed as an AND gate here too, is represented as the last diagram in FIG. 5. It emerges that only one signal occurs when the armature comes to rest, and that other signals are filtered out.

If in the case of very weak armature reaction the voltage peak occurring at the termination of movement cannot be reliably recognized, it is possible for further differentiating circuits to be provided connected in series between the differentiating circuit 27 and the trigger 31.

Figure 6:
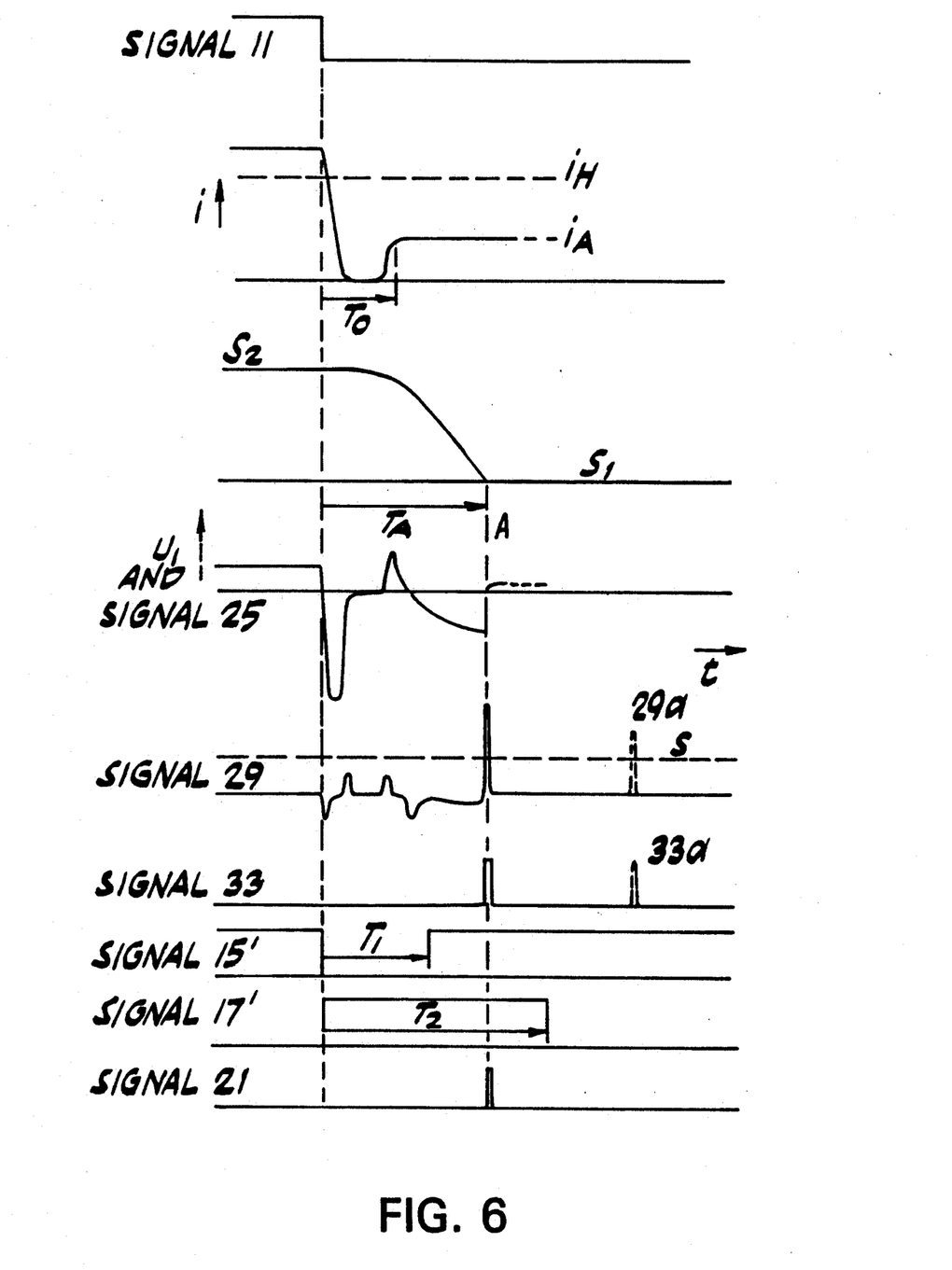
FIG. 6 shows the temporal variation in different signals of the circuit in accordance with FIG. 3 during an opening operation.

FIG. 6 shows the temporal variation in the signals in a circuit according to FIG. 3, in the case of an opening operation.

The temporal variation in the control signal 11 is represented in the uppermost diagram of FIG. 6. The controllable switch 7 of the control and regulation unit 9 is triggered on the basis of the drop in the control signal in such a way that the current i through the excitation winding 3 of the electromagnetic switching member or of the solenoid valve falls very rapidly. In the case of the representation in FIG. 6, the current i falls to the value 0. However, it is also possible for negative current values to be set here using a suitable circuit. As soon as the current i undershoots the holding current $i_H$, the armature of the electromagnetic switching member leaves the actuated position S2 and moves into the non-actuated position S1. After a time $T_0$, the current is raised to a value below the holding current, to be precise, the constant opening current $i_A$. The rapid reduction in the current i produces a high acceleration of the armature. The time $T_0$ is set using the time generator 13. The time $T_0$ is chosen such that the current is not raised again until the armature has begun to move. Here, too, the period $T_0$ is determined, for example, by experiments and chosen such that the current is raised before expiry of the opening time $T_A$, that is to say before the opening instant A is reached.

The movement of the armature is likewise represented in FIG. 6. It moves from the actuated position S2 within the opening time $T_A$ into the non-actuated position S1. The movement of the switch is terminated at the opening instant A.

The temporal variation in the voltage u1 at the excitation winding 3, and in the output signal 25 of the measuring device 23 are likewise represented in FIG. 6. Owing to the rapid variation in current, a very rapid variation also takes place in the voltage u1. As soon as the armature moves, there is a reaction on the voltage variation. After expiry of the opening time $T_A$ at the instant A, the movement, and thus the reaction of the armature movement on the voltage, is terminated. The reaction is rendered possible by the constant opening current, which induces a magnetic field in the excitation winding.

The temporal derivative of the output signal 25 is generated in the differentiating circuit 27, whose output signal 29 is likewise represented in FIG. 6. The output signal 29 varies depending upon whether the voltage at the output of the measuring device rises or drops. The sharp drop in voltage at the termination of the armature movement is indicated by a voltage peak. In this regard, the potential of the voltage is so high that a predetermined threshold voltage S is overshot.

When the threshold value S is overshot, a signal, which is likewise represented in FIG. 6, appears at the output 33 of the trigger 31.

It is likewise to be seen from FIG. 6 that a signal also appears at the output 33 of the trigger 31 if, owing to discrepancies, for example, in the case of fluctuations in the supply voltage, the signal at the output of the differentiating stage 27 overshoots the threshold value S. Such a signal is designated in FIG. 6 by 29a. In this case, there appears at the output of the trigger a signal 33a which could be misinterpreted as termination of the movement of the armature. This leads to uncertainties in the evaluation of the signals.

Error signals are filtered out by the gate circuit described with reference to FIGS. 4 and 5. The negative pulse 15', which is present during the period $T_1$, and the positive pulse 17, during the period $T_2$ are represented in FIG. 6. By means of the evaluation circuit 19, which is designed as an AND gate, the output signal 33 of the trigger 31 is passed only in a period which starts shortly before the opening instant A and ends shortly thereafter.

The periods $T_1$ and $T_2$ predetermined by the time generators 15 and 17 of the gate circuit can be designed to be constant. However, it is also possible to choose these periods as a function of parameters which influence the closing time $T_E$ or the opening time $T_A$. As parameters, quantities are chosen that are decisive for the functioning of the electromagnetic switching member. For example, the times $T_1$ and $T_2$ are chosen as a function of the voltage of the voltage source 5, or as a function of the value of the current i flowing through the excitation winding 3.

Owing to the fact that after the closing the excitation winding 3 is supplied either with a constant inrush current or with a constant inrush voltage, a magnetic field is induced that is influenced by the movement of the armature. Owing to the magnetic field there is a reaction on the temporal variation in the quantity that is not held constant, i.e. in the case of the constant inrush current there is reaction on the voltage $U_1$, in the case of the constant inrush voltage on the current i. Variations in this quantity then serve to determine the termination of the movement cycle. Likewise, in the case of the opening operation, the constant opening current induces a magnetic field in the excitation winding 3 of the electromagnetic switching member, which is varied by the armature movement. The temporal variations in the voltage $U_1$ based thereon can then be used to measure the termination of the armature movement.

It follows from what has been said above that the armature movement, and in particular the instant of the termination of movement, can be measured both in the case of triggering by means of a voltage, and also in the case of triggering by means of a current.

The constant inrush or constant opening current, or the constant inrush voltage is applied after expiry of the time $T_0$ up to the point that the closing or opening time has expired. This renders the monitoring of the armature movement particularly simple. Influences due to voltage fluctuations or current fluctuations, which wrongly allow conclusions to be drawn concerning the termination of the armature movement, are thereby largely eliminated.

After the closing instant, the current i flowing through the excitation winding 3, or the voltage u1 applied to the winding can have an arbitrary variation above the limiting value predetermined by the holding current or by the holding voltage until the introduction of the opening operation. Correspondingly, after the opening instant and until the introduction of the next closing operation, the current i or the voltage u1 can have an arbitrary variation below the limiting value predetermined by the inrush current or the inrush voltage.

With the aid of the process or of the device described above, it is possible for the movement, in particular the termination of the movement of the armature, for example of a solenoid valve for the fuel injection of an internal combustion engine, to be very precisely monitored, so that the injection instant and injection period can be optimally set.

We claim:

1. An apparatus for controlling an electromagnetic switching member having an excitation winding and a movable armature, comprising:

a measuring device coupled to the excitation winding for measuring variations in at least one of the current and voltage across the excitation winding and for generating output signals indicative of the variations for determining the degree of armature movement based on the variations;

a switching device coupled between the electromagnetic switching member and a voltage source for controlling the current through the electromagnetic switching member;

a regulating device coupled to the switching device for controlling the switching device to control the current through the excitation winding for actuating the armature, wherein the armature is actuated by increasing the current through the excitation winding; and a timing element coupled to the regulating device for generating a first time interval upon increasing the current for actuating the armature which is shorter than the time required for the armature to reach an actuated position, whereupon expiration of the first time interval, the regulating device decreases the current to a predetermined level for maintaining the armature in the actuated position.

2. An apparatus as defined in claim 1, further comprising a gate circuit for filtering out the signals originating from the measuring device except during a second time interval, which begins shortly before the termination of armature movement and ends shortly thereafter.

3. An apparatus as defined in claim 2, wherein the gate circuit includes a firsts timing unit and a second timing unit, the input terminals of the first and second timing units being coupled to the regulating device, and an AND gate coupled to the outputs of the first and second timing units.

4. An apparatus as defined in claim 1, further comprising a comparator unit responsive to the output signals of the measuring device for transmitting output signals indicative of the termination of armature movement.

5. An apparatus as defined in claim 4, further comprising a differentiating unit coupled between the measuring device and the comparator unit for transmitting output signals to the comparator unit indicative of the derivative of the signals transmitted by the measuring device.

6. An apparatus as defined in claim 1, wherein the timing element includes a monostable flip-flop.

7. An apparatus as defined in claim 1, wherein the switching device is a transistor.

8. An apparatus as defined in. claim 1, wherein the armature is moved from the actuated position into a non-actuated position by decreasing the current through the excitation winding, whereupon the timing element generates a second time interval upon decreasing the current which is shorter than the time required for the armature to reach the non-actuated position, and the regulating device increases the current to a second predetermined level upon expiration of the second time interval.

9. An apparatus for controlling an electromagnetic switching member having an excitation winding and a movable armature, comprising the following steps:
 measuring the variations in at least one of the current and voltage across the excitation winding and generating signals indicative of the variations for determining the degree of armature movement based on the variations;
 controlling the level of at least one of the current and voltage across the excitation winding and increasing at least one of the current and voltage for actuating the armature;
 measuring a first time interval upon increasing the at least one of the current and voltage for actuating the armature, wherein the first time interval is shorter than the time required for the armature to reach an actuated position; and
 decreasing at least one of the current and voltage across the excitation winding to a first predetermined level upon expiration of the first time interval for maintaining the armature in the actuated position.

10. A method as defined in claim 9, wherein the predetermined level of the at least one of the current and voltage is at least equal to a respective at least one of the current and voltage necessary to drive the armature into the actuated position.

11. A method as defined in claim 9, wherein the armature is moved from the actuated position into a non-actuated position by rapidly decreasing the at least one of the current and voltage across the excitation winding to rapidly move the armature, measuring a second time interval upon decreasing the at least one of the current and voltage which is shorter than the time required for the armature to reach the non-actuated position, and increasing the at least one of the current and voltage to a second predetermined level upon expiration of the second time interval.

12. A method as defined in claim 11, wherein the second predetermined level is less than the first predetermined level of the at least one of the current and voltage.

13. A method as defined in claim 11, wherein the first and second time intervals are selected so that the armature begins to move prior to the expiration of each respective time interval.

14. A method as defined in claim 9, wherein the variations in the at least one of the current and voltage across the excitation winding are measured during a third time interval beginning shortly before termination of armature movement and expiring shortly thereafter.

15. A method as defined in claim 14, wherein the beginning and end of the third time interval are selected based on the supply voltage of the electromagnetic switching member.

16. A method as defined in claim 14, wherein the third time interval is based on factors selected from the group including the voltage level of the energy supply for the excitation winding and the first predetermined level of current or voltage.

17. A method as defined in claim 14, wherein the third time interval is based on factors selected from the group including the ambient temperature and factors influencing the switching performance of the electromagnetic switching member.

18. A method as defined in claim 9, wherein the first predetermined level is maintained substantially constant until termination of armature movement.

* * * * *